T. B. PEARSON.
CYLINDRICAL STRUCTURE.
APPLICATION FILED FEB. 24, 1917.
1,339,862.
Patented May 11, 1920.
3 SHEETS—SHEET 2.
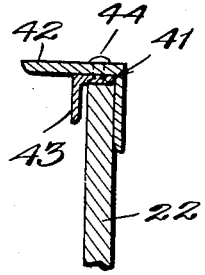
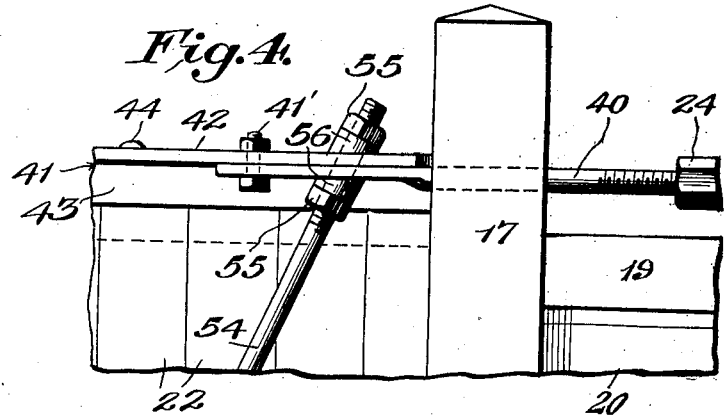
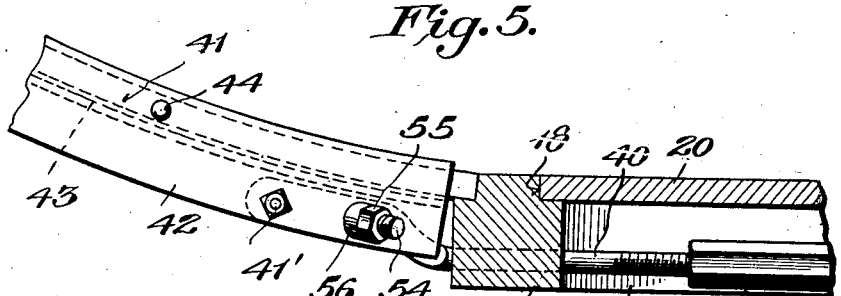
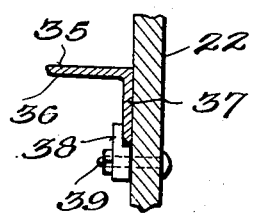
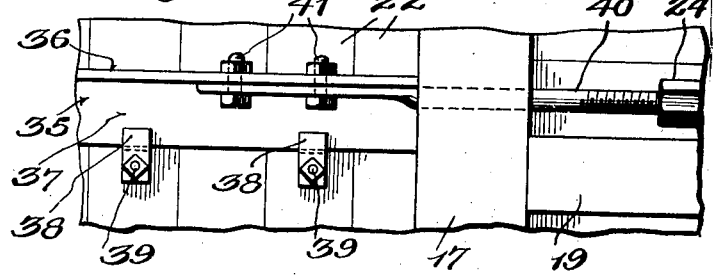
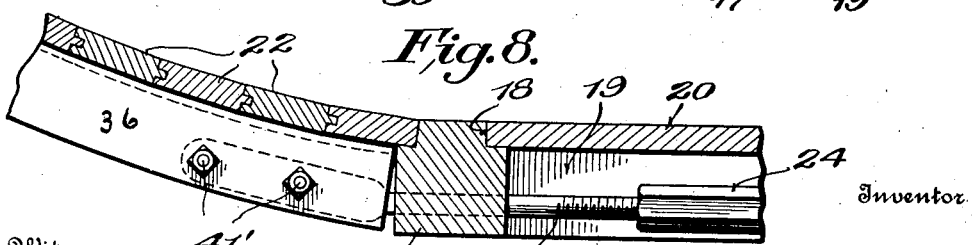

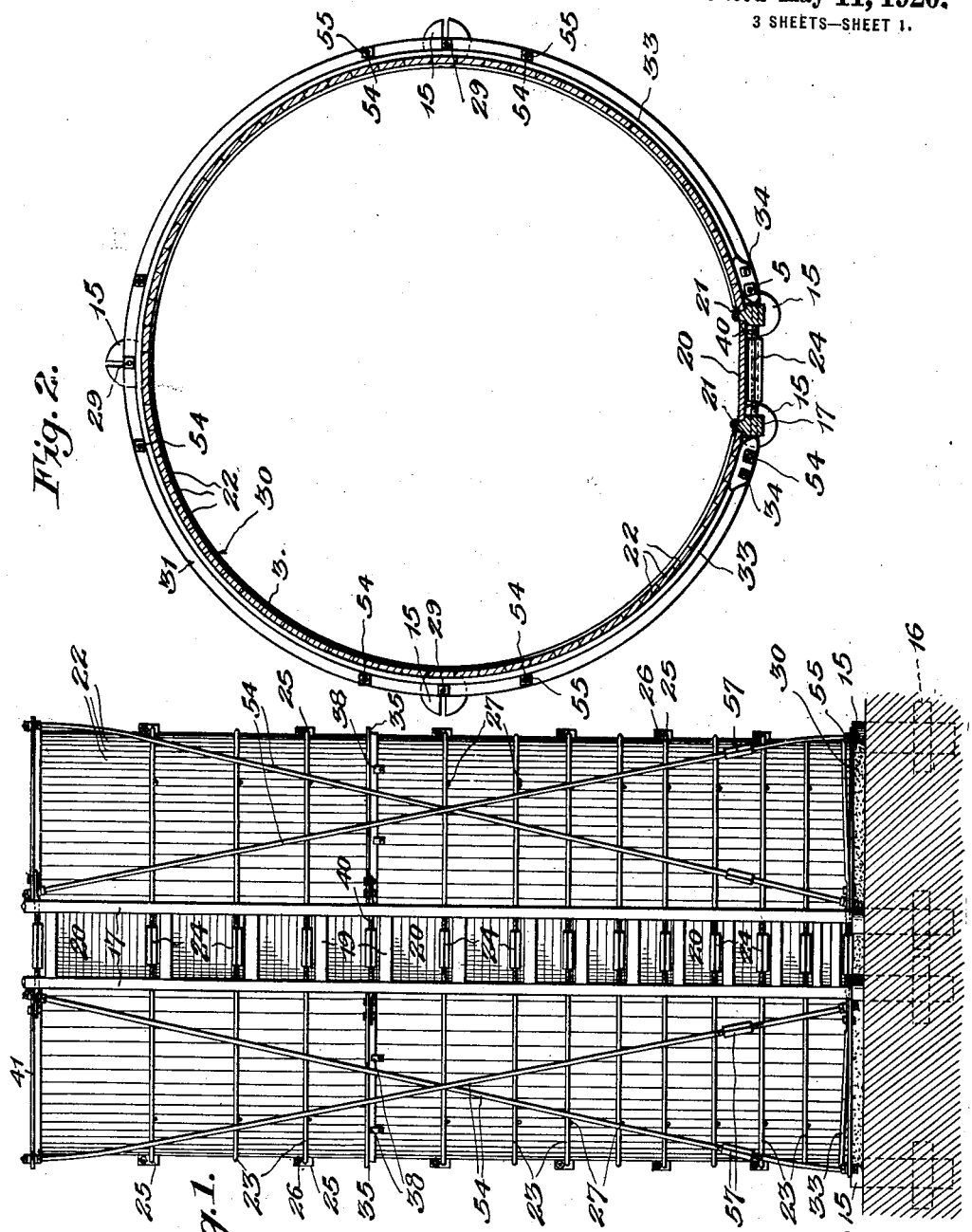

T. B. PEARSON.
CYLINDRICAL STRUCTURE.
APPLICATION FILED FEB. 24, 1917.
1,339,862.
Patented May 11, 1920.
3 SHEETS—SHEET 3.
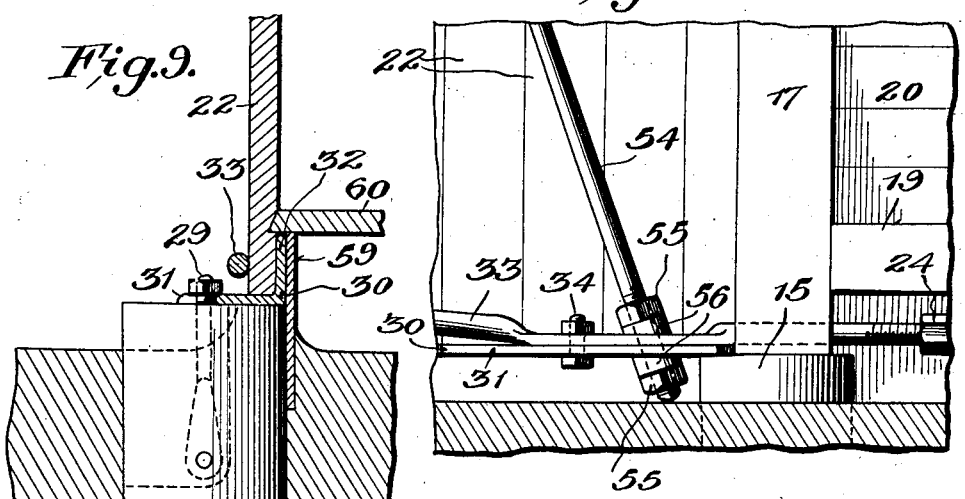
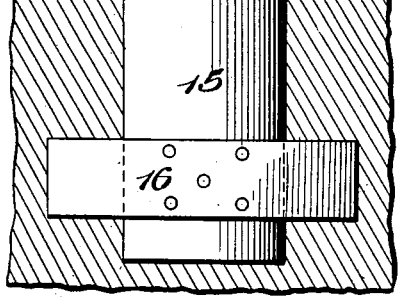
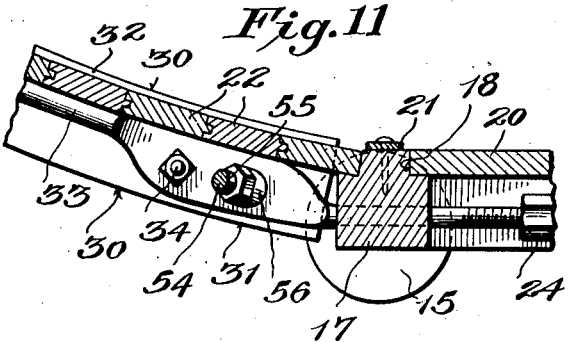
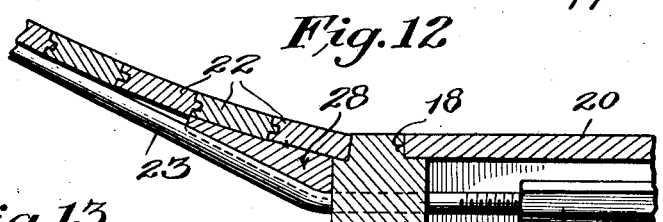
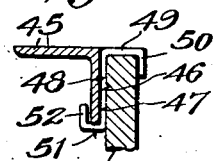
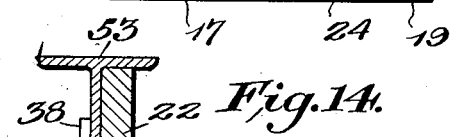
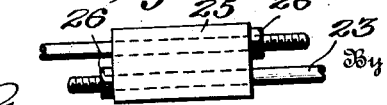

UNITED STATES PATENT OFFICE.

TERRELL BROOKS PEARSON, OF WACO, TEXAS.

CYLINDRICAL STRUCTURE.

1,339,862.  Specification of Letters Patent.  Patented May 11, 1920.

Application filed February 24, 1917. Serial No. 150,723.

*To all whom it may concern:*

Be it known that I, TERRELL BROOKS PEARSON, a citizen of the United States, residing at Waco, in the county of McLennan and State of Texas, have invented certain new and useful Improvements in Cylindrical Structures, of which the following is a specification, reference being had therein to the accompanying drawings.

This invention relates to hollow structures of generally cylindrical shape, partly formed of staves that preferably are of wood, adapted to be used as silos, grain-bins, tanks, cisterns, or other containers such as are put together or formed in the place of use.

Among the objects of the invention are to provide for formation of such a structure of lumber and metal materials of standard dimensions and shapes that ordinarily can be obtained from commercial stocks, so that the minimum amount of shop work on materials will be required; to enable such a structure to be placed on and reliably held by a post foundation, thus avoiding the necessity of using a more expensive concrete or masonry foundation that involves more difficulty and time in its formation; to form the parts in such manner that they may be assembled and disassembled easily, thus enabling the structure to be moved without loss of materials; to provide for the efficient tightening and holding of the staves together and for separating staves to make a space between them for other staves when they are required on account of shrinkage or deterioration of staves already in the structure; to provide means for keeping the lower ends of the staves off the ground and thus reduce the liability of the staves to rot at the bottom of the structure; to provide means to anchor the structure to the foundation-posts; and generally to provide a structure of this character that will retain its integrity under the adverse influences of wind and other weather conditions to which it may be subjected.

When read in connection with the description herein, the details of construction and arrangement of parts contemplated by the invention will be apparent from the accompanying drawings, forming part hereof, wherein, for purposes of illustration, the invention is disclosed as applied to a silo.

While the disclosures herein now are considered to exemplify a preferable embodiment of the invention, it is to be understood that it is not the intention to be limited necessarily thereto in interpretation of the claims, as changes, modifications, and adaptations, within the limits of the claims, can be made without departing from the nature and spirit of the invention.

Like reference-characters refer to corresponding parts in the views of the drawings, of which—

Figure 1 is a front elevation of a silo in which this invention is embodied;

Fig. 2 is a horizontal section taken just above the foundation-posts;

Fig. 3 is a vertical section through the upper ring;

Fig. 4 is an elevation of a part of the upper portion of the structure;

Fig. 5 is a fragmentary top view of the structure;

Fig. 6 is a vertical section through the intermediate ring;

Fig. 7 is an elevation of a part of the intermediate portion of the structure;

Fig. 8 is a fragmentary horizontal section taken just above the intermediate ring;

Fig. 9 is a vertical section through parts at the bottom of the structure;

Fig. 10 is an elevation of a part of the lower portion of the structure;

Fig. 11 is a fragmentary horizontal section taken just above the lower ring;

Fig. 12 is a fragmentary horizontal section taken just above one of the hoops;

Fig. 13 is a vertical section of a modified form of upper ring;

Fig. 14 is a vertical section of still another form of upper ring; and

Fig. 15 is a plan view of one of the hoop-connecting lugs.

The structure rests on a foundation of posts 15 set into the ground at suitable intervals in circular arrangement. Every post has a cross-piece 16 attached near its bottom and extending laterally therefrom, the cross-piece operating to increase the hold of the post in the ground and to prevent its being pulled therefrom.

A door-frame extends from bottom to top in the wall of the structure, and it includes perpendicular frame members 17, which have their inside corners cut away to form channels or grooves 18, and which are connected at intervals by cross-pieces or sills 19. Access to the interior of the structure is had through the openings between the sills, these openings being closed by doors 20 seated in the facing or inner channels or grooves 18 and on the cross-pieces or sills 19. The frame members 17 at the bottom rest on two of the foundation-posts 15, which are placed in position for that purpose, and the posts and frame members are secured together by straps 21 bolted thereto. The wall of the structure, other than the portion formed by the door-frame and its doors, is made of vertically-disposed wooden staves 22 extending substantially parallel with the frame, the staves adjacent to the frame members 17 being seated in the outside channels or grooves 18 thereof.

The staves are maintained in proper relation partly by a plurality of hoops 23 formed of rods extending around the structure and through the frame members 17 and having screw-threaded ends connected by turnbuckles 24 positioned in the space between said frame members and each located just above one of the cross-pieces or sills 19. The hoops may be of several pieces connected by having screw-threaded end portions passed through lugs 25 and held therein by adjusting-nuts 26. Ordinarily, the compression of the hoops on the staves may be adjusted by the trunbuckles, which are readily accessible at the door-frame; but, if adjustment beyond the scope of the turnbuckles is required, it can be effected by turning the nuts 26. The hoops are prevented from falling, when they become loosened with respect to the staves, by nails or the like 27 driven into the staves at intervals below the hoops. In the passing of a hoop through practically the center of the door-frame members 17, it necessarily departs from the circular contour of the stave-wall at a slight distance on each side of the door-frame, and suitable metal or wooden blocks 28, grooved on their outer faces to receive the hoop, fill the spaces thus left between the wall and hoops, in order that the staves may be prevented from bulging at these places.

In order to facilitate erection of the structure, to afford means for insertion of additional staves when contraction of those already in the wall render them necessary, to permit easy withdrawal of deteriorated staves and substitution of sound ones, and to avoid collapse of the structure after removal of the hoops when the structure is being taken down, it includes semi-rigid metal rings made of angle or other suitable material of commercial size and shape and possessing such properties as will permit alteration in the circumference under the action of turnbuckles or the like, whereby the rings may be caused to contract and permitted to expand with respect to the stave-wall.

By bolts 29, the lowermost of these semi-rigid angle-rings, 30, has its horizontal web 31 secured to the tops of the foundation-posts 15, and the other web 32 extends at right angles upwardly from the inside marginal portion of the horizontal web inside of the stave-wall. The angle-ring extends from each side of the door-frame entirely around the stave-wall of the structure. A hoop 33, formed of a rod, and as a part of the semi-rigid ring, extends entirely around the structure just above the horizontal web and outside of the perpendicular web and of the stave-wall and through the frame members 17, between which latter its end portions are connected by a turnbuckle 24. The hoop may be of several pieces connected together, as are the other hoops, by lugs 25. At each side of the door-frame, the hoop 33 is flattened so that it can be connected by a bolt 34 to the horizontal web 31 of the ring. The arrangement is such that, upon operation of the turnbuckle in one direction, the ring is contracted to bring the staves tightly against one another and against the perpendicular door-frame members. The web 32 and hoop 33 afford a channel or groove above the web 31 for reception of the staves.

Another semi-rigid angle-ring 35 is positioned around the outside of the stave-wall on each side of the door-frame approximately midway between the top and bottom of the structure, with one web 36 extending outwardly from the staves and the other web 37 depending therefrom and constituting a band in contact with the staves. The ring is prevented from falling when it becomes loosened with respect to the staves by lugs 38, in which the depending or perpendicular web 37 rests, and secured to the staves at suitable intervals by bolts 39. The ends of the ring are connected by rods 40, each of which has one end flattened and secured to the under side of the web 36 by bolts 41', the rod passing through one of the door-frame members 17 and having its other end portion screw threaded. The abutting end portions of the rods between the frame members are connected by a turnbuckle 24, and the rods and turnbuckle act to draw the ends of the ring toward the door-frame and the ring against the stave-wall, whereby the staves are held tightly in the wall.

The other of the semi-rigid angle-rings, 41, is positioned at the top of the structure, where it rests on the upper ends of the staves. It is formed of a larger right-angular member 42 and a smaller right-angular member 43. The two members have their horizontal webs secured together by bolts 44 in such manner that the other web of the larger member depends inside of the staves, the horizontal web of the smaller member rests on the top ends of the staves, and the other web of the smaller member depends outside of the staves, the depending webs being a distance apart slightly greater than the thickness of the staves so that the staves may slide in the groove or channel between them. The ends of the ring are connected by rods 40 and associated parts similar to and functioning in a manner like those described as connecting the ends of the intermediate ring 35.

If desired, instead of a ring of the form of that designated by 41, as just described, there may be used a ring 45, as shown by Fig. 13. One part of this ring is an angle member 46, similar to that of ring 35, disposed with a depending web against the staves. This member is held outside of and with its depending web in contact with the upper portion of the staves by hanger members 47 disposed at suitable intervals around the structure. Each of the hanger members includes a perpendicular main web 48 positioned between the depending web of the angle member and the staves, a horizontal upper flange 49 extending from the upper part of the main web over the top of the stave-wall and having a flange 50 depending inside of the wall and forming with the main web a groove or channel for the staves, and a horizontal lower flange 51 extending from the lower part of the main web under the depending web of the angle member and having a flange 52 extending outside of the web and with the main web forming a groove or seat therefor.

Further, instead of a ring of the form of that designated by 41, there may be used a ring 53, such as shown by Fig. 14. This ring is a T-angle member, with the central web abutting the outside of the staves and with the cross web extending at one side over the tops of the staves. The staves are held to the ring by lugs 38, in which the central web rests, secured to the staves by bolts 39, as in the case of the intermediate ring 35.

In order to brace the structure against lateral deformation under the influence of wind or otherwise, brace rods or cables 54 extend obliquely between and connect the lower ring 30 and the upper ring 41, through the horizontal webs of which they project. The braces are held in connection with the ring-webs by nuts 55, which seat against angle-saddles 56. The braces are provided with turnbuckles 57, or with lugs such as used in the hoops, so that they may be tightened and caused to draw the lower and upper rings against the ends of the staves.

In erection of the structure, the foundation-posts 15 first are set in the ground and earth tamped down around them. Then the parts of the lowermost ring are assembled and the ring is placed on the tops of the posts. A scaffold then is built around the space to be occupied by the structure, and the door-frame is set into place and braced in upright position with its perpendicular members 17 resting on two of the foundation-posts, to which they are secured by the straps 21. Then the intermediate ring 35 and the upper ring 41 are assembled and temporarily secured to and supported on the scaffold in the relative places they will occupy in the completed structure and with their rods 40 extending through the perpendicular door-frame members and the threads of the rods caught by the turnbuckles.

Thereafter, starting at one side of the door-frame, the staves are successively placed in position inside of the intermediate ring, with their lower ends between the web 32 and the hoop 33 of the lower ring, and with their upper ends in the groove or channel formed by the depending webs of the members 42 and 43 of the upper ring.

When a sufficient number of staves are in place to form a continuous wall extending from one side of the door-frame around the structure to the other side, the turnbuckles of the rings are tightened. If the ends of the rods 40 and of the lower hoop 33 nearly meet in the turnbuckles and the staves still are not tight enough, the turnbuckles are turned in a loosening direction. If, as a result of this turning, a greater movement is given to the stave-confining elements on the side not desired to be loosened than on the other, due to greater resistance on one side than the other, a block may be placed between the end of the turnbuckle and the perpendicular frame-member on the side on which loosening is not desired. The block in such a position will prevent the turnbuckle from moving from its approximately median position toward the side on which loosening is not desired and result in loosening the hoops on the other side. After the loosening operation, a stave or staves may be inserted to fill the space thus obtained, after which the turnbuckles are tightened. This method also may be employed, after the structure is completed, in removing deteriorated staves and substituting sound ones.

It will be seen that, by employing the lower, intermediate, and upper semi-rigid rings, the staves are held in the positions in which they are put during formation of the stave-wall and thereafter until the rings and hoops are tightened.

After the tightening of the rings, the hoops are placed in position around the structure and given an initial tightening by operation of their turnbuckles. Then the oblique brace members are placed in the structure and tightened. Thereafter, the lower ring 30 is secured to the foundation-posts by the bolts 29.

The final tightening of the rings, hoops, and brace members should be done in unison, as the tightening or loosening of any one will offset all others. In the case of the hoops, the initial tightening only will be done ordinarily by the turnbuckles, the final tightening being effected at the lugs 25.

If desired, planks or the like 59 may be placed around on the inside of the structure next to and tight against the bottom ring and in a trench in the ground and nailed to the foundation-posts. Soil then is filled into the bottom of the structure within the periphery of the wall formed by the plank, and the floor of the structure thus is formed. Moreover, if desired, a plank or similar flooring 60 may be placed in the structure, and the planks may be supported on the upper edges of the plank 59 and of the web 32 of the lower ring.

After erection of the structure is completed, the rings and door-frame are detached from the scaffold and the latter removed.

The structure may be disassembled in a manner practically the reverse of that described for its erection.

Having thus described my invention, what I claim as new, and desire to secure by Letters Patent, is—

1. In a structure of the kind described, a substantially circular wall including staves, and a ring comprising a member of angle metal abutting one side of said wall, a hoop fixedly attached to the end portions of said member and extending around the other side of said wall, and means in said hoop whereby said member and hoop are contracted and expanded.

2. In a structure of the kind described, a substantially circular wall including staves, a perpendicular frame in said wall, and a ring comprising a member of angle metal having a web abutting one side of said wall, a hoop fixedly attached to the end portions of said member and abutting the other side of said wall and having end portions each of which extends into said frame, and means on said end portions whereby said member and hoop are contracted and expanded.

3. In a structure of the kind described, a substantially circular wall including staves, a perpendicular frame in said wall, a ring comprising a member of angle metal having a web abutting the inner side of the wall at its lower end and terminating on each side of said frame, a hoop fixedly attached to the end portions of said member and abutting the outside of the wall and having end portions each of which extends into said frame, means on said end portions whereby said member and hoop are contracted and expanded, a semi-rigid ring having a channel in which the upper ends of said staves are disposed, rods extending from the ends of said rings into said frame, and connecting means on said rods whereby said ring is contracted and expanded.

4. In a structure of the kind described, a substantially circular wall including staves, a perpendicular frame in said wall, a ring comprising a member of angle metal having a web abutting the inner side of the wall at its lower end and terminating on each side of said frame, a hoop fixedly attached to the end portions of said member and abutting the outside of the wall and having end portions each of which extends into said frame, means on said end portions whereby said member and hoop are contracted and expanded, a semi-rigid ring having a channel in which the upper ends of the staves are disposed and terminating on each side of said frame, rods extending from the ends of said ring into said frame, connecting means on said rods whereby said ring is contracted and expanded, and braces connected to said member and hoop at the lower portion and to said ring at the upper portion of the structure and extending obliquely between the places of connection.

In witness whereof, I affix my signature.

TERRELL BROOKS PEARSON.